US008665997B1

(12) United States Patent
Smith (10) Patent No.: US 8,665,997 B1
(45) Date of Patent: Mar. 4, 2014

(54) AIS DEMODULATOR FOR UNKNOWN CARRIER PHASE AND BAUD ALIGNMENT

(75) Inventor: David C. Smith, Columbia, MD (US)

(73) Assignee: The United States of America as Represented by the Director, The National Security Agency, Washington, DC (US)

( * ) Notice: Subject to any disclaimer, the term of this patent is extended or adjusted under 35 U.S.C. 154(b) by 612 days.

(21) Appl. No.: 12/932,367

(22) Filed: Feb. 24, 2011

(51) Int. Cl.
H04L 27/06 (2006.01)

(52) U.S. Cl.
USPC .......................................... 375/340

(58) Field of Classification Search
USPC ................... 375/316, 340, 341, 346
See application file for complete search history.

(56) References Cited

U.S. PATENT DOCUMENTS

| 7,805,146 | B1 | 9/2010 | Beyer |
| 7,809,370 | B2 | 10/2010 | Stolte et al. |
| 8,275,077 | B1 * | 9/2012 | Nelson .......................... 375/341 |
| 2008/0086267 | A1 | 4/2008 | Stolte et al. |
| 2008/0088485 | A1 | 4/2008 | Stolte et al. |
| 2008/0304597 | A1 | 12/2008 | Peach |
| 2009/0161797 | A1 | 6/2009 | Cowles et al. |

OTHER PUBLICATIONS

Nelson et al., "A Simple Matched Filter Apprch to AIS Demodulation in Co-channel Interference", Proc. of the 11th IASTED Int'l Conf. on Sig. and Image Proc., pp. 71-76, Aug. 2009.

Nelson et al., "A Comp. of Two Mthds for Demodulating a Target AIS Sig. Through a Collisn . . . ", Proc. of SPIE Math for Sig and Info Proc, vol. 7444, pp. 0W1-0W12, Aug. 2-5, 2009.
Hopkins et al., "GMSK Co-channel Demodulation", Proc. of SPIE Mathematics for Signal and Information Processing, vol. 7444, pp. 0V1-0V11, Aug. 2-5, 2009.
Berder et al., "Inter-channel Interference Rejection for Maritime AIS System", The 5th Int'l Conf. on Intelligent Transportation Systems Telecomm. Jun. 27-29, 2005.
Clark et al., "Joint Demodulation of Low-Entropy Narrowband Co-channel Signals", 2007 NRL Review, pp. 207-210, 2007.
Le Lina et al., "AIS Information Decoding and Fuzzy Fusion Processing with Marine Radar", IEEE, pp. 1-5, 2008.

* cited by examiner

Primary Examiner — Kevin M Burd
(74) Attorney, Agent, or Firm — Robert D. Morelli (57) ABSTRACT

A method of demodulating an AIS signal by receiving the signal, sampling the signal, estimating the carrier frequency, estimating the complex conjugate of the carrier frequency contribution to each sample, multiplying each sample by the complex conjugate and calling the results a base-banded sampled signal (BBSS), correlating the BBSS with known preambles, identifying a maximum magnitude of the BBSS/preamble correlation and its location and the associated preamble, computing a complex inner product of the preamble with a segment of the BBSS, estimating the carrier phase as an argument function of the eighth step result, estimating a complex conjugate of the carrier phase contribution to the BBSS, multiplying each fifth step result starting at the location of the maximum magnitude of the BBSS/preamble correlation by the tenth step result, and demodulating the results starting at that location.

18 Claims, 4 Drawing Sheets

AIS DEMODULATOR FOR UNKNOWN CARRIER PHASE AND BAUD ALIGNMENT

FIELD OF INVENTION

The present invention relates, in general, to pulse or digital communications and, specifically, to a particular demodulator.

BACKGROUND OF THE INVENTION

The Automatic Identification System (AIS) is an automated signaling system used by ships to identify and avoid collisions with other ships.

An AIS signal contains a preamble selected from one of a number of fixed preambles, a ship's identity, position, course, and speed. AIS systems use Gaussian Minimum Shift Keying (GMSK) modulation and Self Organizing Time Division Multiple Access (SOTDMA) regions. Inside a SOTDMA region, a user broadcasts information in dedicated time slots, which prevents AIS signals from interfering with each other. However, AIS signals originating outside a SOTDMA region may interfere, or collide, with an AIS signal originating within the SOTDMA region. When this happens, demodulation in co-channel interference becomes necessary.

AIS signals employ GMSK demodulation. In GMSK, an information bit, either a −1 or a 1, is transmitted at each baud time, nT, where n is an integer, T is a constant bit duration or baud interval, and where t is time. A GMSK signal has the following form:

$$s(t) = e^{i\phi_0} e^{i\phi(t)} e^{2\pi f_c t},$$

where e raised to a value is the exponential function, i is the square root of −1, $\phi_0$ is carrier phase, $\phi(t)$ is the phase function of s(t), t is time, $\pi$ is a constant, and $f_c$ is carrier frequency.

Articles entitled "A simple matched filter approach to AIS demodulation in co-channel interference," *Proc. of the Eleventh LASTED Int'l Conf on Signal and Image Processing*, pp. 71-76, August 2009, and, "A comparison of two methods for demodulating a target AIS signal through a collision with an interfering AIS signal," *Proc. of SPIE Mathematics for Signal and Information Processing*, vol. 7444, pp. 0W1-0W12, Aug. 2-5, 2009, disclose demodulating an AIS signal when the carrier frequency, carrier phase, and time alignment offset of the signals is known. In the present invention, it is not assumed that these parameters are known.

An article entitled "GMSK Co-Channel Demodulation," *Proc. of SPIE Mathematics for Signal and Information Processing*, vol. 7444, pp. 0V1-0V11, Aug. 2-5, 2009, discloses demodulation of an AIS signal without first removing carrier phase as does the present invention.

An article entitled "Inter-channel interference rejection for maritime AIS system," *The 5th Int. Conf. on Intelligent Transportation Systems Telecomm.*, Jun. 27-29, 2005, discloses the use of a Tukey window and a Chebyshev lowpass filter to avoid spreading of the spectrum.

An article entitled "Joint Demodulation of Low-Entropy Narrowband Cochannel Signals," 2007 *NRL Review*, pp. 207-210, 2007, discloses the use of field-based maximum a posteriori (MAP) joint detection algorithm that uses available a priori information to aid in jointly making a decision of what values are sent. The method tries all permutations and selects the one that maximizes the a posteriori probability. The authors indicate that this method is impractical for all but the shortest of messages, unlike the present invention.

An article entitled "AIS Information Decoding and Fuzzy Fusion Processing with Marine Radar," *IEEE*, pp. 1-5, 2008, discloses decoding AIS signals using multi-factor fuzzy integration decision-making, utilizing information of the target's distance, bearing, velocity, and course, unlike the present invention.

An article entitled "A comparison of two methods for demodulating a target AIS signal through a collision with an interfering AIS signal," Mathematics for Signal and Information Processing, *Proc. of SPIE*, Vol. 7444, pp. 74440W-1-74440W-12, 2009, compares the Laurent-Kaleh demodulation method to a demodulation method that uses filters matched to tri-bit states and phases of GMSK signals (i.e., tri-bit demodulation).

U.S. Pat. No. 7,805,146, entitled "CELL PHONE PDA/GPS COMMUNICATION NETWORK WITH AIS," discloses a method of interfacing a cellular phone to an AIS signal. U.S. Pat. No. 7,805,146 is hereby incorporated by reference into the specification of the present invention.

U.S. Pat. No. 7,809,370, entitled "SPACE BASED MONITORING OF GLOBAL MARITIME SHIPPING USING AUTOMATIC IDENTIFICATION SYSTEM," discloses a device for receiving an AIS signal by a space vehicle and determining the accuracy of the transmitter's location, including determining its accuracy as compared to the location of a space vehicle. U.S. Pat. No. 7,809,370 is hereby incorporated by reference into the specification of the present invention.

U.S. Pat. Appl. No. 20080086267, entitled "SPACE BASED NETWORK FOR DETECTION AND MONITORING OF GLOBAL MARITIME SHIPPING USING AUTOMATIC IDENTIFICATION SYSTEM," discloses a device where a plurality of satellites receive an AIS signal, where the satellites are distributed in two or more orbital planes located at substantially common altitude and having a substantially common inclination. U.S. Pat. Appl. No. 20080086267 is hereby incorporated by reference into the specification of the present invention.

U.S. Pat. Appl. No. 20080088485, entitled "SPACE BASED MONITORING OF GLOBAL MARITIME SHIPPING USING AUTOMATIC IDENTIFICATION SYSTEM," discloses a device where a space vehicle receives an AIS signal and determines the accuracy of the transmitter's position. U.S. Pat. Appl. No. 20080088485 is hereby incorporated by reference into the specification of the present invention.

U.S. Pat. Appl. No. 20080304597, entitled "SYSTEM AND METHOD FOR DECODING AUTOMATIC IDENTIFICATION SYSTEM SIGNALS," discloses a device and method of receiving a plurality of AIS signals, pre-processing the signals to produce digital data, and identifying one or more candidate AIS signals based on Doppler offsets and time estimates associated with the digital data, determining corresponding Doppler offset estimates of the candidates, and decoding the candidate signals. U.S. Pat. Appl. No. 20080304597 is hereby incorporated by reference into the specification of the present invention.

U.S. Pat. Appl. No. 20090161797, entitled "SATELLITE DETECTION OF AUTOMATIC IDENTIFICATION SYSTEM SIGNALS," discloses a device for receiving a plurality of AIS signals, producing digital date there from, identifying one or more candidate AIS signals based on Doppler offsets associated with the digital data, determining corresponding Doppler offset estimates and time estimates of the candidate signals, and decoding the signals. U.S. Pat. Appl. No. 20090161797 is hereby incorporated by reference into the specification of the present invention.

There is a need for a device for and method of demodulating an AIS signal when carrier frequency, carrier phase, and time alignment offset are unknown. The present invention is such a device and method.

SUMMARY OF THE INVENTION

It is an object of the present invention to demodulate an AIS signal.

It is another object of the present invention to demodulate an AIS signal having an unknown carrier frequency and carrier phase in the presence of interference.

The present invention is a method of demodulating an AIS signal having an unknown carrier frequency and carrier phase in the presence of interference.

The first step of the method is receiving an AIS signal.

The second step of the method is sampling the received signal.

The third step of the method is estimating the carrier frequency of the sampled signal.

The fourth step of the method is estimating a complex conjugate of the carrier frequency contribution to each signal sample.

The fifth step of the method is multiplying on the computing device each signal sample by the corresponding result of the fourth step and designating the collective resulting products as a base-banded sampled signal.

The sixth step of the method is generating a GMSK signal without a carrier frequency and without a carrier phase for each known preamble for an AIS signal.

The seventh step of the method is sampling the results of the sixth step.

The eighth step of the method is computing a correlation of the base-banded sampled signal with the results of the seventh step.

The ninth step of the method is identifying a maximum magnitude of the result of the eighth step and its location and designating the known AIS preamble associated with the maximum magnitude as the preamble of the received AIS signal.

The tenth step of the method is computing a complex inner product of the sampled GMSK signal that corresponds to the preamble with a segment of the base-banded sampled signal starting at the location of the maximum magnitude of the seventh step.

The eleventh step of the method is estimating the carrier phase as an argument function of the result of the ninth step.

The twelfth step of the method is estimating a complex conjugate of the carrier phase contribution to the base-banded sampled signal.

The thirteenth step of the method is multiplying each sample of the base-banded sampled signal starting at the location of the maximum magnitude of the seventh step by the result of the eleventh step and designate the results as a modified base-banded sampled signal.

The fourteenth step of the method is GMSK demodulating the results of twelfth step starting at the location of the maximum magnitude of the seventh step.

DETAILED DESCRIPTION

The present invention is a method of demodulating an Automatic Identification System (AIS) signal having an unknown carrier frequency and carrier phase in the presence of interference.

Figure 1:
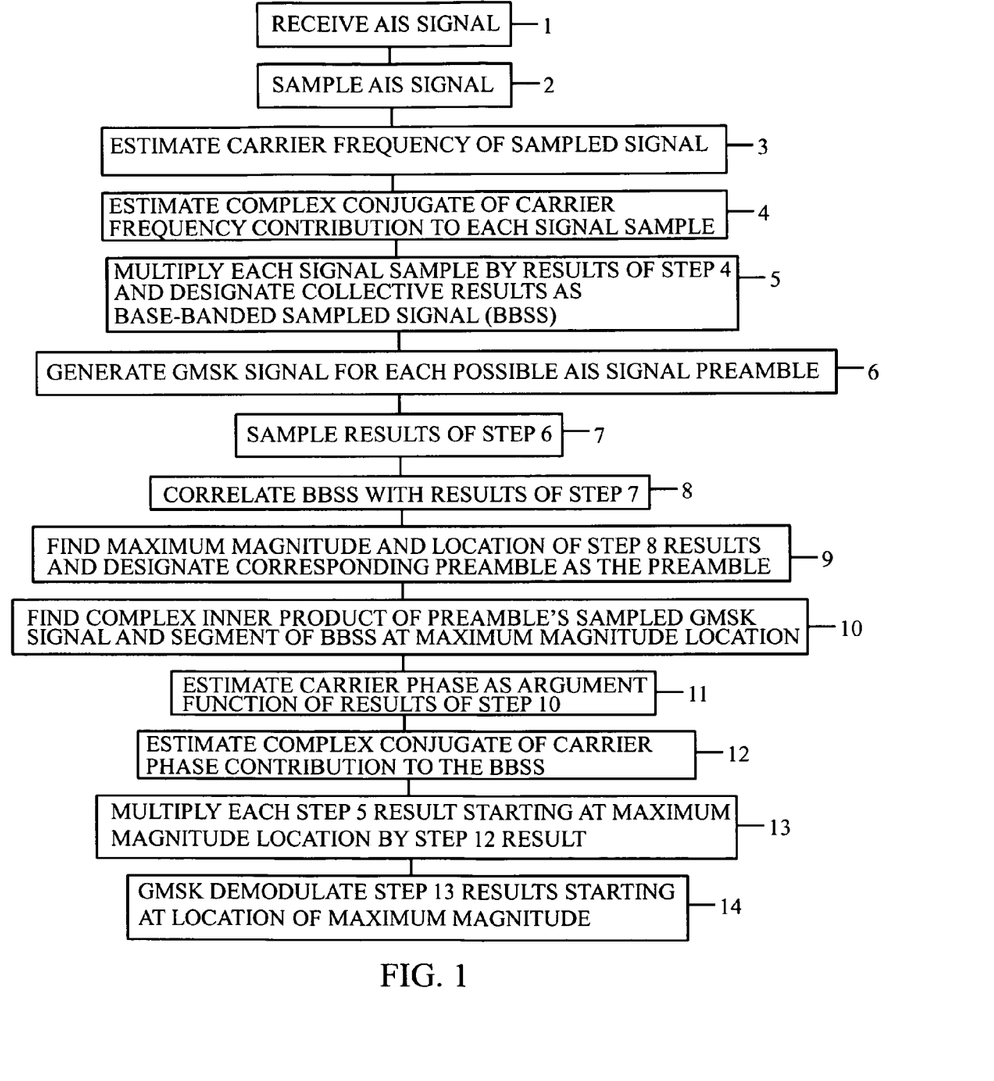
FIG. 1 is a flowchart of the preferred method of the present invention.

FIG. 1 is a flowchart of the preferred method of the present invention.

The first step 1 of the method is receiving on a computing device an AIS signal, having an unknown carrier frequency, unknown carrier phase, information bits transmitted at a known baud rate (i.e., 1/T, where T is the baud interval), and an unknown preamble selected from a set of known preambles, where each preamble has a length equal to that of the other preambles, where the unknown preamble immediately precedes the information bits.

The second step 2 of the method is sampling on the computing device the AIS signal at a user-definable sampling rate. In the preferred embodiment, the AIS signal is sampled at a frequency that is at least twice the highest possible frequency of an AIS signal. For an AIS signal with a frequency of 38 KHz, the present invention would sample the AIS signals at approximately 76,000 Hertz. However, the frequency may increase as technology improves and such frequency increases are anticipated by the present invention. In addition, the AIS signal is sampled so that an integral number of samples are contained within a baud interval. In an alternate embodiment, the sample rate is 8 times the baud rate, where the baud rate is approximately 10,000 Hertz.

The third step 3 of the method is estimating on the computing device the carrier frequency. Any suitable carrier frequency estimation method may be used.

The fourth step 4 of the method is estimating on the computing device a complex conjugate (i.e., C(n)), of the carrier frequency contribution to each signal sample using the estimated carrier frequency, where $$C(n) = e^{-if_c nT_0},$$

and $T_0$ is the reciprocal of the sampling rate.

The fifth step 5 of the method is multiplying on the computing device each signal sample by the corresponding result of the fourth step 4 and designating the collective resulting products as a base-banded sampled signal as follows:

$$S_m(nT_0) = C(n) \times s(nT_0).$$

The sixth step 6 of the method is generating on the computing device a GMSK signal without a carrier frequency and without a carrier phase for each possible AIS signal preamble. There is a known set of preambles used with all AIS signals. Each AIS signal includes one of these known preambles. In the steps below, the present method determines which one of these known preambles is used in the received AIS signal.

The seventh step 7 of the method is sampling the results of the sixth step 6. In the preferred embodiment, the sampling rate is the same as the sampling rate for other samples in the method.

The eighth step 8 of the method is computing on the computing device a correlation of the base-banded sampled signal with each sampled GMSK signal generated from the known preamble.

The ninth step 9 of the method is identifying on the computing device a maximum magnitude of the result of the eighth step 8 and its location and designating the known preamble associated with the maximum magnitude as the preamble of the received AIS signal.

The tenth step 10 of the method is computing on the computing device a complex inner product of the sampled GMSK signal associated with the designated preamble with a segment of the base-banded sampled signal starting at a location equal to the location identified in the seventh step 7.

The eleventh step 11 of the method is estimating on the computing device the carrier phase as an argument function of the result of the tenth step 10.

The twelfth step 12 of the method is estimating on the computing device a complex conjugate of the carrier phase contribution to the base-banded sampled signal.

The thirteenth step 13 of the method is multiplying on the computing device each product of the fifth step 5 starting at the location identified in the eighth step 8 by the result of the twelfth step 12.

The fourteenth step 14 of the method is GMSK demodulating the results of the thirteenth step 13 starting at the location identified in the eighth step 8. Any GMSK demodulator that is appropriate for a sampled GMSK signal with an interference contribution but no carrier frequency contribution or carrier phase contribution may be used, such as a Laurent-Kaleh demodulator or a tri-bit demodulator.

Figure 2A:
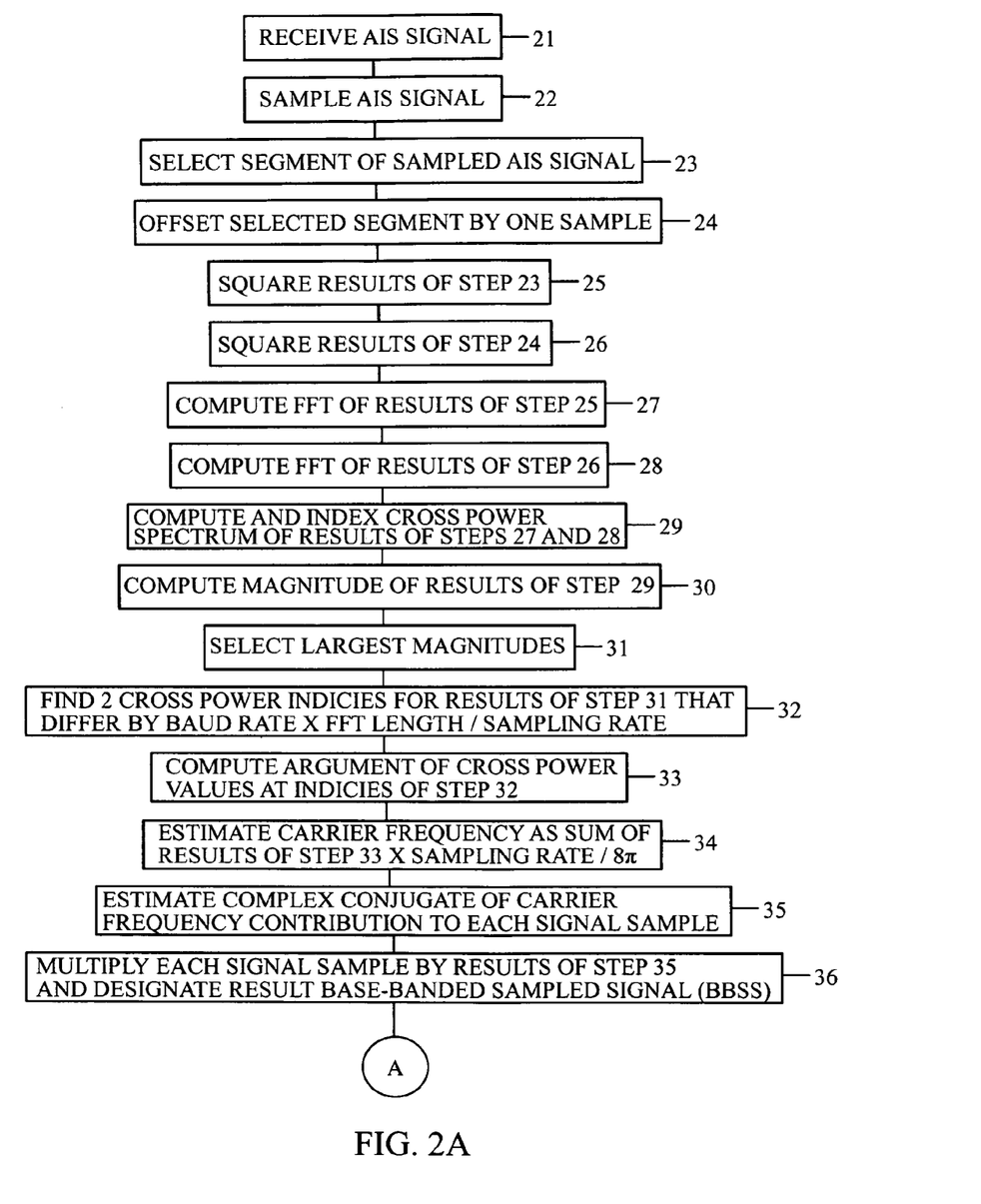
FIGS. 2A-2B is a flowchart of an alternate method of the present invention.
Figure 2B:
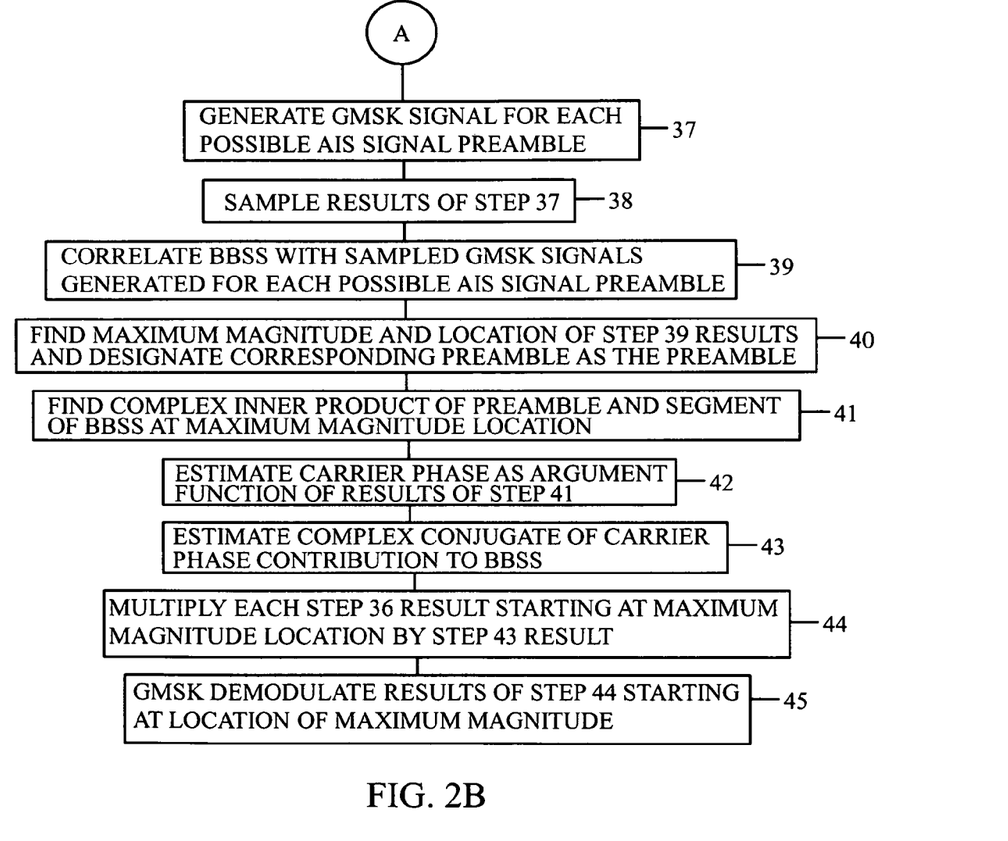

FIGS. 2A and 2B disclose a flowchart of an alternate embodiment of the method of the present invention. The alternate method includes a method of estimating the carrier frequency.

In FIG. 2A, the first step 21 of the alternate method is receiving on a computing device an AIS signal, having an unknown carrier frequency, unknown carrier phase, information bits transmitted at a known baud rate (i.e., 1/T, where T is the baud interval), and an unknown preamble selected from a set of known preambles, where each preamble has a length equal to that of the other preambles, where the unknown preamble immediately precedes the information bits.

The second step 22 of the alternate method is sampling on the computing device the AIS signal at a user-definable sampling rate. In the preferred embodiment, the AIS signal is sampled at a frequency that is at least twice the highest possible frequency of an AIS signal. If the frequency of an AIS signal is 38 KHz then the present invention would sample the AIS signals at a frequency that is at least 76,000 Hertz. However, the frequency may increase as technology improves and such frequency increases are anticipated by the present invention. In addition, the AIS signal is sampled so that an integral number of samples are contained within a baud interval. In an alternate embodiment, the sample rate is 8 times the baud rate, where the baud rate is approximately 10,000 Hertz.

The third step 23 of the alternate method is selecting on the computing device a user-definable segment of the result of the second step 22.

The fourth step 24 of the alternate method is selecting on the computing device a segment of the result of the second step 22 that is offset by one sample from the result of the third step 23.

The fifth step 25 of the alternate method is squaring on the computing device each sample in the results of the third step 23.

The sixth step 26 of the alternate method is squaring on the computing device each sample in the results of the fourth step 24.

The seventh step 27 of the alternate method is computing on the computing device a Fast Fourier Transform (FFT) of the results of the fifth step 25, where the FFT has a user-definable input length. In the preferred embodiment, the FFT input length is 2048 bits.

The eighth step 28 of the alternate method is computing on the computing device a FFT of the results of the sixth step 26.

The ninth step 29 of the alternate method is computing on the computing device a cross power spectrum of the results of the seventh step 27 and the eighth step 28 to produce an indexed set of cross power values.

The tenth step 30 of the alternate method is computing on the computing device a magnitude for each cross power value.

The eleventh step 31 of the alternate method is selecting on the computing device a user-definable number of largest magnitudes computed in the tenth step 30. In the preferred embodiment, the top 1% of the magnitudes are selected.

The twelfth step 32 of the alternate method is identifying two cross power values having indices corresponding to magnitudes from the eleventh step 31 which differ by the baud rate times the input length of the FFT divided by the sampling rate.

The thirteenth step 33 of the alternate method is computing on the computing device an argument function on the cross power values corresponding to the two indices identified in the twelfth step 32.

The fourteenth step 34 of the alternate method is estimating on the computing device the carrier frequency in Hertz (Hz) as a sum of the results of the thirteenth step 33 times the sampling rate divided by $8\pi$.

The fifteenth step 35 of the alternate method is estimating on the computing device a complex conjugate (i.e., C(n)), of the carrier frequency contribution to each signal sample using the estimated carrier frequency, where $$C(n)=e^{-if_cnT_0},$$

and $T_0$ is the reciprocal of the sampling rate.

The sixteenth step 36 of the alternate method is multiplying on the computing device each signal sample by the corresponding result of the fifteenth step 35 and designating the collective results as a modified sampled signal as follows:

$$S_m(nT_0)=C(n)\times s(nT_0).$$

In FIG. 2B, the seventeenth step 37 of the method is generating on the computing device a GMSK signal without a carrier frequency and without a carrier phase for each possible AIS signal preamble. There is a known set of preambles used with all AIS signals. Each AIS signal includes one of these known preambles. In the steps below, the present method determines which one of these known preambles is used in the received AIS signal.

The eighteenth step 38 of the method is sampling the results of the seventeenth step 37. In the preferred embodiment, the sampling rate is the same as the sampling rate used elsewhere in the method.

The nineteenth step 39 of the method is computing on the computing device a correlation of the base-banded sampled signal with each result of the eighteenth step 38.

The twentieth step 40 of the alternate method is identifying on the computing device a maximum magnitude of the result of the eighteenth step 38 and its location and designating the known preamble associated with the maximum magnitude as the preamble of the received AIS signal.

The twenty-first step 41 of the alternate method is computing on the computing device a complex inner product of the sampled GMSK signal associated with the designated preamble identified in the twentieth step 40 with a segment of the base-banded sampled signal starting at the location identified in the twentieth step 40.

The twenty-second step 42 of the alternate method is estimating on the computing device the carrier phase as an argument function of the result of the twenty-first step 41.

The twenty-third step 43 of the alternate method is estimating on the computing device a complex conjugate of the carrier phase contribution to the base-banded sampled signal.

The twenty-fourth step 44 of the alternate method is multiplying on the computing device each result of the eighteenth step 38 starting at the location identified in the twentieth step 40 by the result of the twenty-third step 43.

The twenty-fifth step 45 of the alternate method is GMSK demodulating on the computing device the results of the twenty-third step 43 starting at the location identified in the nineteenth step 39. Any GMSK demodulator appropriate for a sampled GMSK signal with an interference contribution but no carrier frequency contribution or carrier phase contribution may be used, such as a Laurent-Kaleh demodulator or a tri-bit demodulator.

Figure 3:
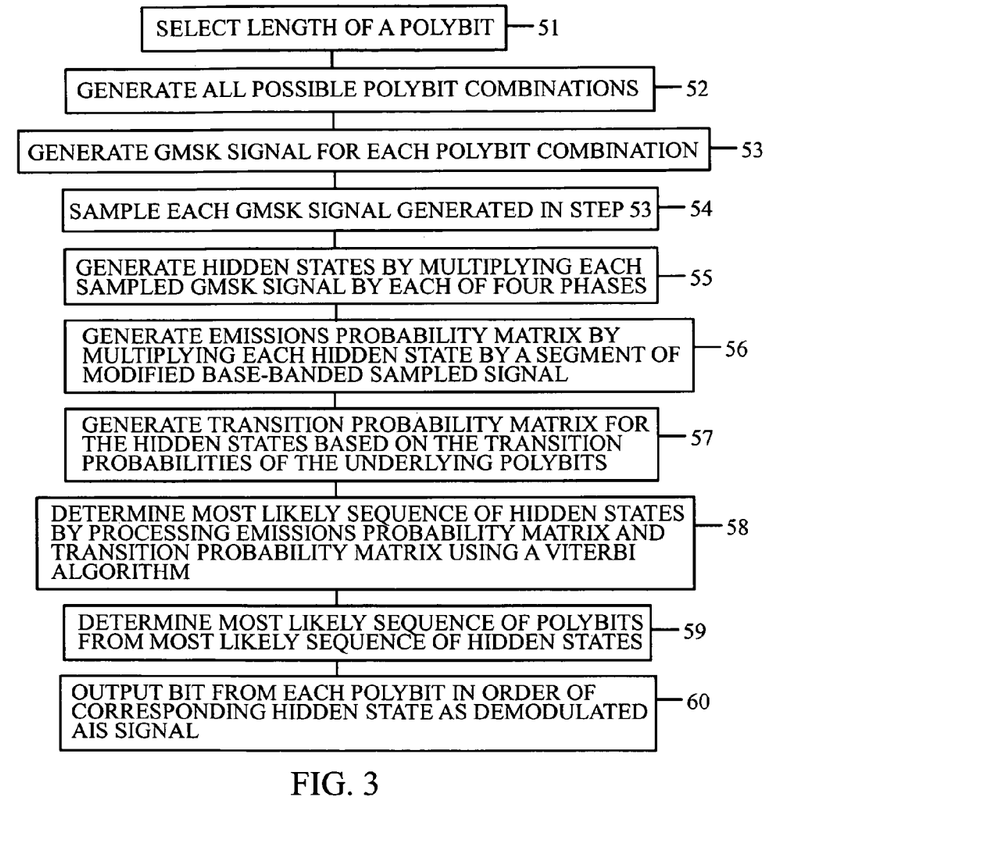
FIG. 3 is a flowchart of a demodulation method of the present invention.

FIG. 3 is a flowchart of a demodulation method of the present invention. The demodulation method is used for the fourteenth step 14 of FIG. 1 and the twenty-fifth step 45 of FIG. 2B.

The first step 51 of the demodulation method of FIG. 3 is selecting a length of a polybit (e.g. 3).

The second step 52 of the demodulation method is generating all possible polybit combinations. For example, if the selected length of a polybit is 3 and a bit in an AIS signal has value 1 or −1 then all possible combinations of polybits are as follows: (111), (11-1), (1-11), (1-1-1), (−111), (−11-1), (−1-11), and (−1-1-1).

The third step 53 of the demodulation method is generating a GMSK signal without a carrier frequency and a without a carrier phase for each polybit combination.

The fourth step 54 of the demodulation method is sampling each GMSK signal generated in the third step 53 at a user-definable sample rate. In the preferred embodiment, the sample rate is the same sample rate used in step 2 of FIG. 1 and step 22 of FIG. 2A (e.g., 8 times the baud rate of the AIS signal). If the length of the polybit was three bits each GMSK signal generated from the combinations of polybits was sampled 8 times per baud then each GMSK sampled signal would include 24 samples.

The fifth step 55 of the demodulation method is generating hidden states that correspond to consecutive information bits in an AIS signal without carrier frequency and carrier phase, where the number of consecutive bits equals the length of the polybit selected in the first step 51. Since consecutive information bits may occur anywhere within an AIS signal, hidden states must account for phase shifts due to information bits that preceded the consecutive information bits in question. There are four possible phase shifts with a phase factor associated with each phase shift, where the phase factors are $e^{in\pi/2}$, for n=0, 1, 2, 3, where i is the square root of −1. Therefore, the hidden states are each of the sampled GMSK signals resulting from the fourth step 54 multiplied by each of the four phase factors. If a GMSK signal that is sampled at 8 times per baud is multiplied by each of four phase factors then 32 possible hidden states would result. A hidden state would have the same length as a sampled GMSK signal that results from the fourth step 54 (e.g., 24 samples).

The sixth step 56 of the demodulation method is generating an emissions probability matrix for the underlying information bits in an AIS signal without carrier frequency and carrier phase. The emissions matrix is a matrix of the products (i.e., real parts of complex inner products) of each hidden state multiplied by each segment of the modified base-banded sampled signal described above at each baud interval starting at the location identified in the twentieth step 40 in FIG. 2B. If there are 32 hidden states then the emissions matrix would have 32 rows (or columns) and a number of columns (or rows) that are equal to the number of information bits in the base-banded sampled signal starting at the location identified in the twentieth step 40 in FIG. 2B minus the number of bits in the preamble.

The seventh step 57 of the demodulation method is generating a transition probability matrix. The transition probability matrix indicates the probability of each hidden state transitioning to each hidden state in the next baud time. Each hidden state can only transition to two other hidden states, because the next hidden state depends upon a new bit that can only be a 1 or a −1, and the phase of the next hidden state will advance or recede by π/2. In the preferred embodiment, the probability of transitioning to a hidden state that depends upon a new bit that is a 1 or a −1 is the same (i.e., 50%). In an alternate embodiment, the probability of transitioning to a hidden state that depends upon a new bit that is a 1 (e.g., 60%) may be different from the probability of transitioning to a hidden state that depends upon a new bit that is a −1 (e.g., 40%). The probability of a hidden state transitioning to hidden state where dependent bits that should be the same between the two are different is 0%. For example, a first GMSK signal based on a polybit (1-11) can only transition to a second GMSK signal based on (−111) or (−11-1), when the polybit transition is to the left, because the two right-most bits of (1-11) for the first GMSK signal become the two left-most bits in the polybit of the second GMSK signal (i.e., either (−111) or (−11-1)). In an alternate embodiment, bit transitions are to the right.

The eighth step 58 of the demodulation method is determining a most likely sequence of hidden states in the AIS signal received without carrier frequency and carrier phase by processing the emissions probability matrix and the transition probability matrix using a Viterbi algorithm.

The ninth step 59 of the demodulation method is determining the polybits that correspond to the most likely sequence of hidden states determined in the eighth step 58.

The tenth step 60 of the demodulation method is outputting a user-definable bit (i.e., an information bit in the received AIS signal) from each polybit determined in the ninth step 59 in an order that corresponds to the sequence of the hidden states on which they depend as the demodulated AIS signal. In the preferred embodiment, the left-most bit in each polybit is put out.

What is claimed is:

1. A method of demodulating an Automatic Identification System signal having an unknown carrier frequency and carrier phase in the presence of interference, comprising the steps of:

a) receiving on a computing device an Automatic Identification System signal, having an unknown carrier frequency, unknown carrier phase, information bits transmitted at a known baud rate, and an unknown preamble selected from a set of known preambles, where each preamble has a length equal to that of the other preambles, where the unknown preamble immediately precedes the information bits;

b) sampling on the computing device the Automatic Identification System signal at a user-definable sampling rate;

c) estimating on the computing device the carrier frequency in Hertz;

d) estimating on the computing device a complex conjugate of the carrier frequency contribution to each signal sample using the estimated carrier frequency;

e) multiplying on the computing device each signal sample by the corresponding result of step (d) and designating the collective results as a base-banded sampled signal;

f) generating a GMSK signal without carrier frequency or carrier phase for each known preamble for the Automatic Identification System;
g) sampling the results of step (f);
h) computing on the computing device a correlation of the base-banded sampled signal with each result of step (g);
i) identifying on the computing device a maximum magnitude of the results of step (h) and its location and designating the known preamble associated with the maximum magnitude as the preamble of the received Automatic Identification System signal;
j) computing on the computing device a complex inner product of the preamble identified in step (i) with a segment of the base-banded sampled signal starting at the location identified in step (i);
k) estimating on the computing device the carrier phase as an argument function of the result of step (j);
l) estimating on the computing device a complex conjugate of the carrier phase contribution to the base-banded sampled signal;
m) multiplying on the computing device each result of step (e) starting at the location identified in step (i) by the result of step (k); and
n) demodulating the results of step (m) starting at the location identified in step (i) using a GMSK demodulator appropriate for a sampled signal with an interference contribution but no carrier frequency contribution or carrier phase contribution.

2. The method of claim 1, wherein said step of sampling on the computing device the Automatic Identification System signal at a user-definable sampling rate is comprised of the step of sampling on the computing device the Automatic Identification System signal at a frequency that is at least twice the frequency of a highest possible frequency for an AIS signal.

3. The method of claim 1, wherein said step of sampling on the computing device the Automatic Identification System signal at a user-definable sampling rate is comprised of the step of sampling on the computing device the Automatic Identification System signal so that an integral number of samples are contained within each baud interval.

4. The method of claim 1, wherein said step of sampling on the computing device the Automatic Identification System signal at a user-definable sampling rate is comprised of the step of sampling on the computing device the Automatic Identification System signal at eight times the baud rate.

5. The method of claim 1, wherein said step of sampling on the computing device the Automatic Identification System signal at a user-definable sampling rate is comprised of the step of sampling on the computing device the Automatic Identification System signal at 76,000 Hertz.

6. The method of claim 1, wherein said step of demodulating the result of step (m) starting at the location identified in step (i) using a GMSK demodulator appropriate for a sampled signal with an interference contribution but no carrier frequency contribution or carrier phase contribution is comprised of the step of demodulating the result of step (m) starting at the location identified in step (i) using a GMSK demodulator selected from the group of GMSK demodulators consisting of a Laurent-Kaleh demodulator and a tri-bit demodulator.

7. The method of claim 1, wherein said step of demodulating the results of step (m) starting at the location identified in step (i) using a GMSK demodulator appropriate for a sampled signal with an interference contribution but no carrier frequency contribution or carrier phase contribution is comprised of the steps:

a) selecting a user-definable length of a polybit, where a polybit represents information bits in a Automatic Identification Signal system;
b) generating all possible polybit combinations;
c) generating a GMSK signal without carrier frequency and carrier phase for each polybit combination;
d) sampling each GMSK signal generated in step (c);
e) generating hidden states by multiplying each result of step (d) by each of four phase factors, where the phases factors are $e^{in\pi/2}$, for n=0, 1, 2, 3, where i is the square root of −1;
f) generating an emissions probability matrix by multiplying each hidden state by each segment of the base-banded sampled signal at each baud time starting at the location identified in step (i);
g) generating a transition probability matrix for the hidden states as a function of the polybits associated with the hidden states; and
h) determining a most likely sequence of hidden states by processing the emissions probability matrix and the transition probability matrix using a Viterbi algorithm.

8. The method of claim 7, wherein the polybit is a three-bit, the sampling rate of the polybit is 8 times the baud rate, and the probability of a hidden state transitioning to each of two hidden states is 0.5.

9. A method of demodulating an Automatic Identification System signal having an unknown carrier frequency and carrier phase in the presence of interference, comprising the steps of:

a) receiving on a computing device an Automatic Identification System signal, having an unknown carrier frequency, unknown carrier phase, information bits transmitted at a known baud rate, and an unknown preamble selected from a set of known preambles, where each preamble has a length equal to that of the other preambles, where the unknown preamble immediately precedes the information bits;
b) sampling on the computing device the Automatic Identification System signal at a user-definable sampling rate;
c) selecting on the computing device a user-definable segment of the result of step (b);
d) selecting on the computing device a segment of the result of step (b) that is offset by one sample from the result of step (c);
e) squaring on the computing device each sample in the results of step (c);
f) squaring on the computing device each sample in the results of step (d);
g) computing on the computing device a Fast Fourier Transform of the results of step (e), where the Fast Fourier Transform has a user-definable input length;
h) computing on the computing device a Fast Fourier Transform of the results of step (f);
i) computing on the computing device a cross power spectrum of the results of step (g) and step (h) to produce an indexed set of cross power values;
j) computing on the computing device a magnitude for each cross power value;
k) selecting on the computing device a user-definable number of largest magnitudes computed in step (j);
l) identifying two cross power values having indices corresponding to magnitudes from step (k) which differ by the baud rate times the input length of the Fast Fourier Transform divided by the sampling rate;

m) computing on the computing device an argument function on the cross power values corresponding to the two indices identified in step (l);
n) estimating on the computing device the carrier frequency in Hertz as a sum of the results of step (m) times the sampling rate divided by $8\pi$;
o) estimating on the computing device a complex conjugate of the carrier frequency contribution to each signal sample using the estimated carrier frequency;
p) multiplying on the computing device each signal sample by the corresponding result of step (o) and designating the collective results as a base-banded sampled signal;
q) computing on the computing device a correlation of the base-banded sampled signal with each sampled GMSK signal generated for each known preamble;
r) identifying on the computing device a maximum magnitude and its location from the results of step (q) and designating the known preamble associated with the maximum magnitude as the preamble of the received Automatic Identification System signal;
s) computing on the computing device a complex inner product of the sampled GMSK signal associated with the preamble identified in step (r) with a segment of the base-banded sampled signal starting at a location equal to the location of the maximum magnitude;
t) estimating on the computing device the carrier phase as an argument function of the result of step (s);
u) estimating on the computing device a complex conjugate of the carrier phase contribution to the base-banded sampled signal;
v) multiplying on the computing device each result of step (p) starting at the location of the maximum magnitude by the result of step (u); and
w) demodulating the results of step (v) starting at the location identified in step (r) using a GMSK demodulator appropriate for a sampled signal with an interference contribution but no carrier frequency contribution or carrier phase contribution.

10. The method of claim 9, wherein said step of sampling on the computing device the Automatic Identification System signal at a user-definable sampling rate is comprised of the step of sampling on the computing device the Automatic Identification System signal at a frequency that is at least twice the frequency of a highest possible frequency for an AIS signal.

11. The method of claim 9, wherein said step of sampling on the computing device the Automatic Identification System signal at a user-definable sampling rate is comprised of the step of sampling on the computing device the Automatic Identification System signal so that an integral number of samples are contained within each baud interval.

12. The method of claim 9, wherein said step of sampling on the computing device the Automatic Identification System signal at a user-definable sampling rate is comprised of the step of sampling on the computing device the Automatic Identification System signal at eight times the baud rate.

13. The method of claim 9, wherein said step of sampling on the computing device the Automatic Identification System signal at a user-definable sampling rate is comprised of the step of sampling on the computing device the Automatic Identification System signal at 76,000 Hertz.

14. The method of claim 9, wherein said step of computing on the computing device a Fast Fourier Transform of the results of step (e), where the Fast Fourier Transform has a user-definable input length is comprised of the step of computing on the computing device a Fast Fourier Transform of the results of step (e), where the Fast Fourier Transform has an input length of 2048 bits.

15. The method of claim 9, wherein said step of selecting on the computing device a user-definable number of largest magnitudes computed in step (j) is comprised of the step of selecting on the computing device a top 1% of the largest magnitudes computed in step (j).

16. The method of claim 9, wherein said step of demodulating the result of step (v) starting at the location identified in step (r) using a GMSK demodulator appropriate for a sampled signal with an interference contribution but no carrier frequency contribution or carrier phase contribution is comprised of the step of demodulating the result of step (v) starting at the location identified in step (r) using a GMSK demodulator selected from the group of GMSK demodulators consisting of a Laurent-Kaleh demodulator and a tri-bit demodulator.

17. The method of claim 9, wherein said step of demodulating the results of step (v) starting at the location identified in step (r) using a GMSK demodulator appropriate for a sampled signal with an interference contribution but no carrier frequency contribution or carrier phase contribution is comprised of the steps:
  a) selecting a user-definable length of a polybit, where a polybit represents information bits in a Automatic Identification Signal system;
  b) generating all possible polybit combinations;
  c) generating a GMSK signal without carrier frequency and carrier phase for each polybit combination;
  d) sampling each GMSK signal generated in step (c);
  e) generating hidden states by multiplying each result of step (d) by each of four phase factors, where the phases factors are $e^{in\pi/2}$, for n=0, 1, 2, 3, where i is the square root of $-1$;
  f) generating an emissions probability matrix by multiplying each hidden state by each segment of the base-banded sampled signal;
  g) generating a transition probability matrix for the hidden states as a function of the polybits and phases associated with the hidden states; and
  h) determining a most likely sequence of hidden states by processing the emissions probability matrix and the transition probability matrix using a Viterbi algorithm.

18. The method of claim 17, wherein the polybit is a three-bit, the sampling rate of the polybit is 8 times the baud rate, and the probability of a hidden state transitioning to each of two hidden states is 0.5.

* * * * *